US012310361B2

(12) United States Patent
May et al.

(10) Patent No.: US 12,310,361 B2
(45) **Date of Patent: *May 27, 2025**

(54) METHODS FOR CONTROL OF PESTS

(71) Applicant: Bio-Gene Technology Limited, Melbourne (AU)

(72) Inventors: Peter May, Red Hill (AU); Robert Klupacs, East Melbourne (AU)

(73) Assignee: Bio-Gene Technology Limited, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,654

(22) Filed: Sep. 21, 2023

(65) Prior Publication Data

US 2024/0065265 A1 Feb. 29, 2024

Related U.S. Application Data

(63) Continuation of application No. 17/045,457, filed as application No. PCT/AU2019/050300 on Apr. 5, 2019, now Pat. No. 11,800,866.

(30) Foreign Application Priority Data

Apr. 6, 2018 (AU) ................................ 2018901151

(51) Int. Cl.
*A01N 35/06* (2006.01)

(52) U.S. Cl.
CPC .................................... *A01N 35/06* (2013.01)

(58) Field of Classification Search
CPC ...................................................... A01N 35/06
See application file for complete search history.

(56) References Cited

U.S. PATENT DOCUMENTS

| | | | | |
|---|---|---|---|---|
| 4,202,840 | A | 5/1980 | Gray et al. | |
| 7,820,209 | B2 | 10/2010 | Spooner-Hart et al. | |
| 11,259,522 | B2 * | 3/2022 | Klupacs | A01N 37/34 |
| 2005/0070576 | A1 * | 3/2005 | Spooner-Hart | A01N 65/42 514/408 |
| 2008/0234386 | A1 | 9/2008 | Spooner-Hart et al. | |
| 2020/0323202 | A1 | 10/2020 | Klupacs et al. | |

FOREIGN PATENT DOCUMENTS

| | | | |
|---|---|---|---|
| JP | 2017-538684 | A | 12/2017 |
| WO | WO 2016/099929 | A1 | 6/2016 |
| WO | WO 2017/221158 | A1 | 12/2017 |
| WO | WO 2019/006514 | A1 | 1/2019 |
| WO | WO 2019/006516 | A1 | 1/2019 |
| WO | WO 02/089587 | A1 | 11/2022 |

OTHER PUBLICATIONS

"Pesticide" _Wikipedia, downloaded Aug. 14, 2024.*
International Search Report, PCT/AU2019/050300, May 2, 2019.
Abderrahmane, K., et al., "Insecticide potency on alfalfa aphids of kanuka, ravintsara and tea tree essential oils and neem vegetable oil", Journal of Environmental Solutions (2012) vol. 1, Issue 1, pp. 16-22.
Ikeura, H. et al. "Repellent Effect of Herb Extracts on the Population of Wingless Green Peach Aphid, *Myzus persicae* Sulzer (Hempiptera: Aphididae)", Journal of Agricultural Science (2012) vol. 4, No. 5, pp. 139-144.
Rani, P.U., "Systemic toxicity of different plant derived chemicals and essential oils against safflower aphid, *Uroleucon carthami* (Homoptera Aphididae)", Indian Journal of Entomology (2004) vol. 66, No. 4, pp. 345-348.
May, P., "New β-triketone insecticides offer novel mode of action to control resistant insects", International Pest Control (Nov.-Dec. 2016), available on the internet at: bio-gene.com.au/wp-content/uploads/2017/06/161224-IPC_NovDec16_p310-311_New-B-triketone-insecticides-offer-novel-mode-of-action-to-control-resistant-insects_P-May.pdf.
Park, C.G., et al., "Myrtaceae Plant Essential Oils and their β-Triketone Components as Insecticides against *Drosophila suzukii*", Molecules (2017) vol. 22, Issue 7, No. 1050, pp. 1-10.
Sameza, M.L., et al., "Potential use of Eucalyptus globulus essential oil against Phytophthora colocasiae the causal agent of taro leaf blight", European Journal of Plant Pathology (2014) vol. 140, pp. 243-250.
Extended European Search Report (ESSR) issued in respect of corresponding European Patent Application No. 19781629.1 dated Sep. 9, 2021.
SBS News, "Eucalyptus extract a weapon against Zika", Aug. 4, 2016, XP055835323, Retrieved from the World-Wide-Web at: sbs.com.au/news/eucalyptus-extract-a-weapon-against-zika.
Elzinga, D. A. et al. 2014 "Suppression of plant defenses by a *Myzus persicae* (green peach aphid) salivary effector protein" Mol Plant Microbe Interact 27(7): 747-756.
Bett, P. K et al., 'Chemical composition of Cupressus lusitanica and Eucalyptus saligna leaf essential oils and bioactivity against major insect pests of stored food grains', Industrial Crops and Products, 2016, vol. 82, pp. 51-62.
Costa, A.A., et al., 2017 "Repellent and Larvicidal Activity of the Essential Oil From Eucalyptus nitens Against Aedes aegypti and Aedes albopictus (Diptera: Culicidae)," Journal of Medical Entomology, 54(3): 670-676.
Daglish, Gregory J., et al., "Impact of resistance on the efficacy of binary combinations of Spinosad, chlorpyrifos-methyl and s-methoprene against five stored-grain beetles," Journal of Stored Products Research 44 (2008) 71-76.
Daglish, Gregory J., et al., "Implications of Methoprene resistance for managing *Rhyzopertha dominica* (F.) in stored gain," Journal of Stored Products Research 54 (2013) 8-12.

(Continued)

*Primary Examiner* — Yong L Chu
(74) *Attorney, Agent, or Firm* — Knobbe, Martens, Olson & Bear, LLP

(57) ABSTRACT

A method of controlling aphid pests including exposing the aphid pests on a host plant to a pest-controlling effective amount of a compound of formula (I):

(I)

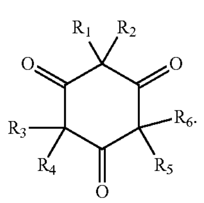

9 Claims, 3 Drawing Sheets

(56) References Cited

OTHER PUBLICATIONS

Fang, F. et al., 'In vitro activity of ten essential oils against Sarcoptes scabiei', Parasites & Vectors, 2016, vol. 9, article No. 594, pp. 1-7.
Greene, T. et al. 'Antiparasitic behavior in New Zealand parakeets', Notornis Journal of the Ornithological Society of New Zealand, Dec. 1989, vol. 36, part 4, pp. 322-323.
Jeong, E-Y, et al., 2008 "Acaricidal Activity of Triketone Analogues Derived from Leptospermum Scoparium Oil Against House-Dust and Stored-Food Mites," Pest Management Science, 65(3): 327-331.
Kerr, R.W., 1951 "Adjuvants for Pyrethrins in Fly Sprays. I. The Adjuvant Action of Some Essential Oils and Other Materials From Australian Plants," Commonwealth Sci. Ind. Research Organization, Bull., No. 261, pp. 7-31, Chemical Abstracts Accession No. 2001:152622.
Pino, J. A. et al., "Chemical composition and antibacterial activity of the essential oil of Callistemon speciosus (Sims) DC. leaves from Cuba" The Journal of Essential Oil Research, 2013, vol. 25, No. 5, pp. 418-422 (abstract only).
Sparks, Thomas C. and Nauen, Ralf, "IRAC: Mode of action classification and insecticide resistance management," Pesticide Biochemistry and Physiology, 121 (2015), pp. 122-128.
Spooner-Hart, Robert Neil, PhD Thesis "Investigations on Essential Oils of Selected Australian Flora, in Particular Those Containing ß-Triketones, for Activity Against Arthropods", School of Science and Health, University of Western Sydney, Mar. 2013.
Thomas, J. et al., 'Evaluation of Repellent Properties of Volatile Extracts From the Australian Native Plant *Kunzea ambigua* Against Aedes aegypti (Diptera: Culcidae)', Journal of Medical Entymology, 2009, vol. 46, iss. 6, pp. 1387-1391.
Chinese Decision on Rejection in CN Patent Application No. 201880058147.2 dated Feb. 23, 2022.
Chen et al, "Study on the screening method for optimal synergetic ratio of combined pesticides" ACTA Phytophylacica Sinica, vol. 27, No. 4, Dec. 2000, pp. 349-354.
Gu, Zhongyan, "Qualitative and quantitative analysis of synergism of pesticide compounding", Jiangsu Agricultural Sciences, 1990, No. 3, pp. 31-34.
Ning, Qianji, et al., "Synergism of mixed insecticides on the newly-hatched nymphs of Periplaneta americana", Pesticides; 36(3), pp. 14-15 (1997).
Karinja, Filip "First efficacy result delivers insecticide-driven boost for io-Gene", Small Caps [online]. Mar. 2018.

* cited by examiner

METHODS FOR CONTROL OF PESTS

FIELD OF THE INVENTION

The present invention relates to a method of controlling aphid pests comprising exposing the aphid pests to an effective pest-controlling amount of a triketone compound of formula (I).

BACKGROUND OF THE INVENTION

Aphids are small sap-sucking insects that are members of the superfamily Aphidoidea. Aphids colonise host plants and rapidly reproduce, often parthenogenically (without males), under temperate climatic conditions. More than 5000 species of aphid have been described and at least 400 of these species are able to colonise food, fibre or ornamental commercial plants. Some aphids are monophagous feeding on only one type of plant species. Some aphids are able to colonise a few plant species and others, such as the green peach aphid, are generalists and can colonise and feed on many species of plants.

Adult and nymph aphids suck the plant hosts' nutrient-containing sap found in phloem vessels of the plant. Their ability to rapidly reproduce to give large populations leads to serious damage to plant crops that become the host of aphid infestations, for example, limiting growth and yield of the host plant.

The Russian wheat aphid (*Diuraphis noxia*) is a cereal crop pest that can cause significant losses and is considered an invasive species in some countries. Russian wheat aphid is native to Southwest Asia but has been introduced into Africa, Europe, the United States of America and recently into Australia. Russian wheat aphid is a particular pest of wheat and barley and may cause chlorosis, necrosis, wilting, stunting and low grain production. Not only does the aphid drain nutrition from the plant, it is able to increase the amount of essential amino acids in the phloem sap by triggering breakdown of proteins. The quality of flour produced from infested wheat is reduced as there is a significant effect on the gliadin/glutenin ratio that makes the flour unsuitable for bread making.

Green peach aphid (*Myzus persicae*) is a common pest of broadacre and horticultural crops including pulses, legumes, cereals, vegetables and tree crops. Green peach aphids also cause damage to crops by reducing the nutrition of the plant by sucking sap. Large infestations can cause significant crop damage and yield loss.

Aphids such as green peach aphid not only cause damage to plant by feeding on sap in their phloem, they are also efficient at spreading plant viruses and their honeydew secretions attract sooty mould.

Although crop damaging aphids may be controlled by chemical insecticides there are often difficulties in control as aphids can develop resistance to particular classes of chemical control agents.

There is therefore a constant need to develop new insecticides that are environmentally friendly and are effective at controlling crop damaging pests such as aphids.

SUMMARY OF THE INVENTION

The present invention is predicated at least in part by the discovery that flavesone is effective at causing mortality in green peach aphid and Russian wheat aphid.

In one aspect, the present invention provides a method of controlling aphid pests on a host plant comprising exposing the aphid pests to a pest-controlling effective amount of a compound of formula (I):

(I)

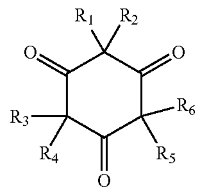

wherein $R_1$ is selected from —C(═O)$R_7$, —$OR_8$, —$SR_8$, —$C_{1-10}$hydroxyalkyl, —$NR_9R_{10}$, —C(═N—$R_9$)$R_7$, —C(═N—OH)$R_7$, —NO, —$NO_2$, —N($OR_8$)$R_7$ and —$OSO_3R_8$;

$R_2$ is selected from hydrogen, —$C_{1-10}$alkyl, —$C_{2-10}$alkenyl, aryl and heteroaryl;

$R_3$, $R_4$, $R_5$ and $R_6$ are each independently selected from hydrogen, —$C_{1-10}$alkyl, —$C_{3-6}$ cycloalkyl, —$C_{2-10}$alkenyl, —$C_{1-10}$haloalkyl, —$C_{1-10}$dihaloalkyl, —$C_{1-10}$trihaloalkyl, —$OR_8$, —$SR_8$, —$NR_9R_{10}$, —C(═N—$R_9$)$R_7$, —NO, —$NO_2$, —$NR_9OR_8$, —$OSO_3R_8$, —$C_{1-10}$alkylaryl and —C(═O)$R_7$;

$R_7$ is selected from hydrogen, —$C_{1-10}$alkyl, —$C_{2-10}$alkylaryl, $C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl, —$C_{1-10}$nitroalkyl, —$C_{1-3}$alkylO$C_{1-3}$alkyl, —$C_{1-3}$alkylO$C_{1-3}$haloalkyl, —$C_{1-3}$alkylO$C_{1-3}$dihaloalkyl, —$C_{1-3}$alkylO$C_{1-3}$trihaloalkyl, —$OR_8$, —$SR_8$ and —$NR_9R_{10}$;

$R_8$ is selected from hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$ haloalkoxy, —$C_{1-10}$hydroxyalkyl, —$C_{1-10}$thioalkyl and —$C_{1-10}$nitroalkyl;

$R_9$ and $R_{10}$ are independently selected from hydrogen, —$C_{1-10}$alkyl, —$C_{2-10}$alkylaryl, —$C_{3-6}$ cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$ trihaloalkyl; or a tautomer or agriculturally acceptable salt thereof.

In one particular embodiment, the triketone compound is flavesone.

In some particular embodiments, the aphid pest is selected from Russian wheat aphid (*Diuraphis noxia*) and green peach aphid (*Myzus pericae*).

DETAILED DESCRIPTION OF THE INVENTION

Figure 1:
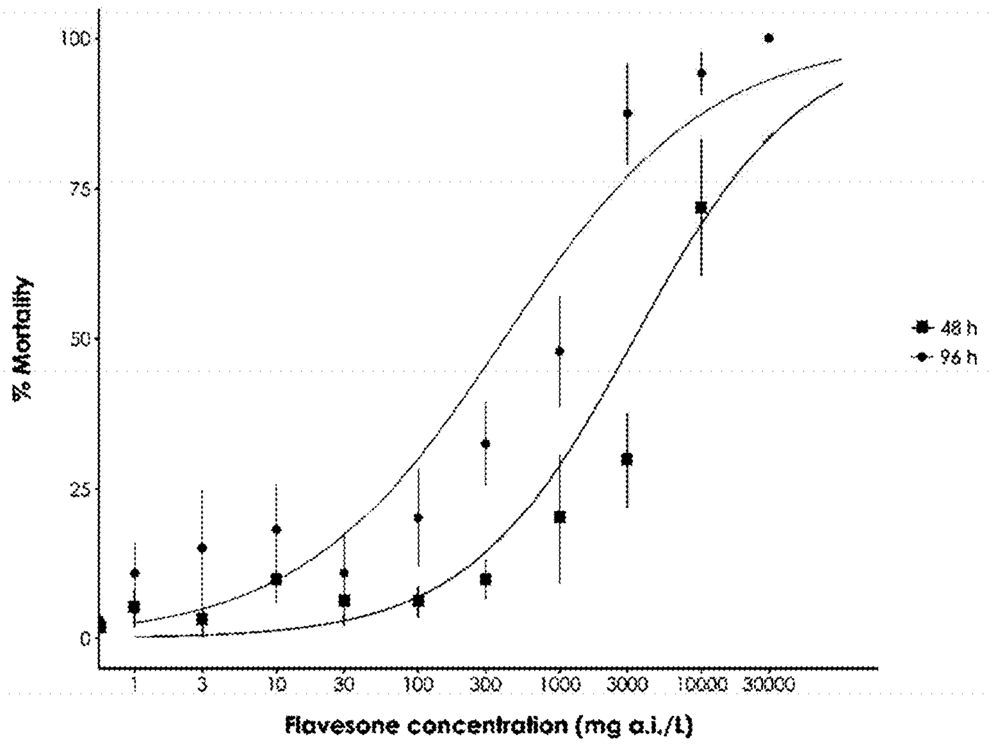
FIG. 1 is a graphical representation of the dose response curves of *D. noxia* when exposed to flavesone after 48 (red) and 96 (blue) hours exposure, with standard error bars and linear model fitted.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "an element" means one element or more than one element.

As used herein, the term "about" refers to a quantity, level, value, dimension, size, or amount that varies by as much as 30%, 25%, 20%, 15% or 10% to a reference quantity, level, value, dimension, size, or amount.

Except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The term "controlling" used herein refers to preventing or removing an infestation of pests, particularly aphid pests, including repelling the pest from the environment, combatting, eradicating or destroying pests, increasing the mortality of the pests, inhibiting the growth of pests, and/or inhibiting the development of the pests.

As used herein, the term "environment" refers to an environment in which the compound of formula (I) may be applied to ensure that the pest is exposed to the compound. The environment may be an agricultural environment, or a household environment that hosts or potentially hosts aphid pests. An agricultural environment includes environments for growing crops, trees and other plants of commercial importance that may be susceptible to infestation. The agricultural environment includes not only the plant itself but also the soil and area around the plants as they grow. The agricultural environment not only includes crop farms, but also horticultural farms and plant nurseries. A household environment includes environments inhabited by humans or animals and may include domestic gardens.

As used herein, the term "alkyl" refers to a straight chain or branched saturated hydrocarbon group having 1 to 10 carbon atoms. Where appropriate, the alkyl group may have a specified number of carbon atoms, for example, $C_{1-6}$alkyl which includes alkyl groups having 1, 2, 3, 4, 5 or 6 carbon atoms in a linear or branched arrangement. Examples of suitable alkyl groups include, but are not limited to, methyl, ethyl, n-propyl, i-propyl, n-butyl, i-butyl, t-butyl, n-pentyl, 2-methylbutyl, 3-methylbutyl, 4-methylbutyl, n-hexyl, 2-methylpentyl, 3-methylpentyl, 4-methylpentyl, 5-methylpentyl, 2-ethylbutyl, 3-ethylbutyl, heptyl, octyl, nonyl and decyl.

As used herein, the term "alkenyl" refers to a straight-chain or branched hydrocarbon group having one or more double bonds between carbon atoms and having 2 to 10 carbon atoms. Where appropriate, the alkenyl group may have a specified number of carbon atoms. For example, $C_2$-$C_6$ as in "$C_2$-$C_6$alkenyl" includes groups having 2, 3, 4, 5 or 6 carbon atoms in a linear or branched arrangement. Examples of suitable alkenyl groups include, but are not limited to, ethenyl, propenyl, isopropenyl, butenyl, butadienyl, pentenyl, pentadienyl, hexenyl, hexadienyl, heptenyl, octenyl, nonenyl and decenyl.

As used herein, the term "cycloalkyl" refers to a saturated cyclic hydrocarbon. The cycloalkyl ring may include a specified number of carbon atoms. For example, a 3 to 6 membered cycloalkyl group includes 3, 4, 5 or 6 carbon atoms. Examples of suitable cycloalkyl groups include, but are not limited to, cyclopropyl, cyclobutyl, cyclopentyl and cyclohexyl.

As used herein, the term "aryl" is intended to mean any stable, monocyclic, bicyclic or tricyclic carbon ring system of up to 7 atoms in each ring, wherein at least one ring is aromatic. Examples of such aryl groups include, but are not limited to, phenyl, naphthyl, tetrahydronaphthyl, indanyl, fluorenyl, phenanthrenyl, biphenyl and binaphthyl.

The term "heteroaryl" as used herein, represents a stable monocyclic, bicyclic or tricyclic ring of up to 7 atoms in each ring, wherein at least one ring is aromatic and at least one ring contains from 1 to 4 heteroatoms selected from the group consisting of O, N and S. Heteroaryl groups within the scope of this definition include, but are not limited to, acridinyl, carbazolyl, cinnolinyl, quinoxalinyl, quinazolinyl, pyrazolyl, indolyl, isoindolyl, 1H,3H-1-oxoisoindolyl, benzotriazolyl, furanyl, thienyl, thiophenyl, benzothienyl, benzofuranyl, benzodioxane, benzodioxin, quinolinyl, isoquinolinyl, oxazolyl, isoxazolyl, imidazolyl, pyrazinyl, pyridazinyl, pyridinyl, pyrimidinyl, pyrrolyl, tetrahydroquinolinyl, thiazolyl, isothiazolyl, 1,2,3-triazolyl, 1,2,4-triazolyl, 1,2,4-oxadiazolyl, 1,2,4-thiadiazolyl, 1,3,5-triazinyl, 1,2,4-triazinyl, 1,2,4,5-tetrazinyl and tetrazolyl. Particular heteroaryl groups have 5- or 6-membered rings, such as pyrazolyl, furanyl, thienyl, oxazolyl, indolyl, isoindolyl, 1H,3H-1-oxoisoindolyl, isoxazolyl, imidazolyl, pyrazinyl, pyridazinyl, pyridinyl, pyrimidinyl, pyrrolyl, thiazolyl, isothiazolyl, 1,2,3-triazolyl, 1,2,4-triazolyl and 1,2,4-oxadiazolyl and 1,2,4-thiadiazolyl.

The term "haloalkyl" as used herein refers to an alkyl group in which one or more hydrogen atoms of the alkyl group is replaced with a halo atom. Where appropriate, the alkyl group may have a specified number of carbon atoms, for example, $C_{1-6}$haloalkyl which includes haloalkyl groups having 1, 2, 3, 4, 5 or 6 carbon atoms in a linear or branched arrangement. Examples of haloalkyl groups include fluoromethyl, difluoromethyl, trifluoromethyl, 1-fluoroethyl, 2-fluoroethyl, 1,1-difluoroethyl, 2,2-fluoroethyl, 1,1,2-trifluoroethyl, 2,2,2-trifluoroethyl, 3-fluoropropyl, 3,3-difluoropropyl, 3,3,3-trifluoropropyl, 4-fluorobutyl, 4,4-difluorobutyl, 4,4,4-trifluorobutyl, 5-fluoropentyl, 5,5-difluoropentyl, 5,5,5-trifluoropentyl, 6-fluorohexyl, 6,6-difluorohexyl or 6,6,6-trifluorohexyl, chloromethyl, dichloromethyl, trichloromethyl, 1-chloroethyl, 2-chloroethyl, 1,1-dichloroethyl, 2,2-chloroethyl, 1,1,2-trichloroethyl, 2,2,2-trichloroethyl, 3-chloropropyl, 3,3-dichloropropyl, 3,3,3-trichloropropyl, 4-chlorobutyl, 4,4-dichlorobutyl, 4,4,4-trichlorobutyl, 5-chloropentyl, 5,5-dichloropentyl, 5,5,5-trichloropentyl, 6-chlorohexyl, 6,6-dichlorohexyl or 6,6,6-trichlorohexyl, bromomethyl, dibromomethyl, tribromomethyl, 1-bromoethyl, 2-bromoethyl, 1,1-dibromoethyl, 2,2-dibromoethyl, 1,1,2-tribromoethyl, 2,2,2-tribromoethyl, 3-bromopropyl, 3,3-dibromopropyl, 3,3,3-tribromopropyl, 4-bromobutyl, 4,4-dibromobutyl, 4,4,4-tribromobutyl, 5-bromopentyl, 5,5-dibromopentyl, 5,5,5-tribromopentyl, 6-bromohexyl, 6,6-dibromohexyl or 6,6,6-tribromohexyl and the like.

"Halo" as used herein refers to fluoro, chloro, bromo and iodo.

The terms "hydroxyalkyl", "thioalkyl" and "nitroalkyl" each refer to an alkyl group as defined above in which one hydrogen atom has been replaced by a hydroxyl group, a thiol group or a nitro group respectively.

The term "alkoxy" as used herein refers to an oxygen substituent that is substituted with an alkyl group as defined above. Examples of suitable alkoxy groups include, but are not limited to, $-OCH_3$, $-OCH_2CH_3$, $-O(CH_2)_2CH_3$, —$OCH(CH_3)_2$, —$O(CH_2)_3CH_3$, —$OCH_2CH(CH_3)_2$, —$OC(CH_3)_3$, —$O(CH_2)_4CH_3$ and —$O(CH_2)_5(CH_3)$.

The compounds of formula (I) may be in the form of agriculturally acceptable salts. Suitable agriculturally acceptable salts include, but are not limited to, salts of agriculturally acceptable inorganic acids such as hydrochloric, sulphuric, phosphoric, nitric, carbonic, boric, sulfamic, and hydrobromic acids, or salts of agriculturally acceptable organic acids such as acetic, propionic, butyric, tartaric, maleic, hydroxymaleic, fumaric, maleic, citric, lactic, mucic, gluconic, benzoic, succinic, oxalic, phenylacetic, methanesulphonic, toluenesulphonic, benezenesulphonic, salicyclic, sulphanilic, aspartic, glutamic, edetic, stearic, palmitic, oleic, lauric, pantothenic, tannic, ascorbic and valeric acids.

Base salts include, but are not limited to, those formed with agriculturally acceptable cations, such as sodium, potassium, lithium, calcium, magnesium, ammonium and alkylammonium.

Basic nitrogen-containing groups may be quarternised with such agents as lower alkyl halide, such as methyl, ethyl, propyl, and butyl chlorides, bromides and iodides; dialkyl sulfates like dimethyl and diethyl sulfate; and others.

The compounds of formula (I) may exist in a number of tautomeric forms. For example, tautomerism is shown in the scheme below:

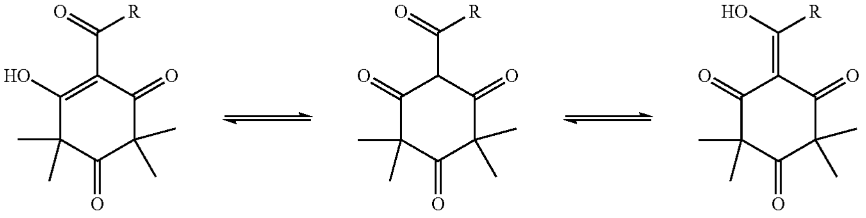

It is intended that all such tautomeric structures are included with in the scope of formula (I).

It is also possible that the compounds for formula (I) may exist in stereoisomeric form. The compounds may be enantiomers or diastereomers and may be present as an individual isomer or in mixture form, including racemic mixtures.

Methods of the Invention

In one aspect, the present invention includes method of controlling aphid pests on a host plant comprising exposing the aphid pests to a pest-controlling effective amount of a compound of formula (I):

(I)

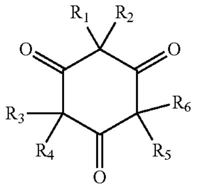

wherein $R_1$ is selected from —C(═O)$R_7$, —$OR_8$, —$SR_8$, —$C_{1-10}$hydroxyalkyl, —$NR_9R_{10}$, —C(═N—$R_9$)$R_7$, —C(═N—OH)$R_7$, —NO, —$NO_2$, —N($OR_8$)$R_7$ and —$OSO_3R_8$;

$R_2$ is selected from hydrogen, —$C_{1-10}$alkyl, —$C_{2-10}$alkenyl, aryl and heteroaryl;

$R_3$, $R_4$, $R_5$ and $R_6$ are each independently selected from hydrogen, —$C_{1-10}$alkyl, —$C_{3-6}$ cycloalkyl, —$C_{2-10}$alkenyl, —$C_{1-10}$haloalkyl, —$C_{1-10}$dihaloalkyl, —$C_{1-10}$ trihaloalkyl, —$OR_8$, —$SR_8$, —$NR_9R_{10}$, —C(═N—$R_9$)$R_7$, —NO, —$NO_2$, —$NR_9OR_8$, —$OSO_3R_8$, —$C_{1-10}$ alkylaryl and —C(═O)$R_7$;

$R_7$ is selected from hydrogen, —$C_{1-10}$alkyl, —$C_{2-10}$alkylaryl, $C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$ haloalkoxy, —$C_{1-10}$hydroxyalkyl, —$C_{1-10}$thioalkyl, —$C_{1-10}$nitroalkyl, —$C_{1-3}$alkyl$OC_{1-3}$alkyl, —$C_{1-3}$alkyl$OC_{1-3}$haloalkyl, —$C_{1-3}$alkyl$OC_{1-3}$dihaloalkyl, —$C_{1-3}$alkyl$OC_{1-3}$trihaloalkyl, —$OR_8$, —$SR_8$ and —$NR_9R_{10}$;

$R_8$ is selected from hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$ haloalkoxy, —$C_{1-10}$hydroxyalkyl, —$C_{1-10}$thioalkyl and —$C_{1-10}$nitroalkyl;

$R_9$ and $R_{10}$ are independently selected from hydrogen, —$C_{1-10}$alkyl, —$C_{2-10}$alkylaryl, —$C_3$. 6cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$ trihaloalkyl; or a tautomer or agriculturally acceptable salt thereof.

In some embodiments, the compound of formula (I) is a compound of formula (II):

(II)

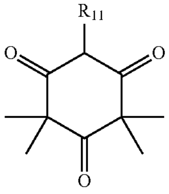

wherein $R_{11}$ is selected from —$CR_{12}R_{13}R_{14}$ or —$NR_{15}R_{16}$;

one of $R_{12}$ and $R_{13}$ is hydrogen and the other is hydroxyl or —$OCR_{17}R_{18}R_{19}$ or $R_{12}$ and $R_{13}$ together form an oxo group (═O) or a=N—OH group;

$R_{14}$ is —$CH(CH_3)CR_{20}R_{21}R_{22}$, —$CH_2CH(CH_3)CR_{20}R_{21}R_{22}$ or —$CH(CH_3)CH_2CR_{20}R_{21}R_{22}$;

$R_{15}$ and $R_{16}$ are independently selected from hydrogen and $C_{1-10}$alkyl;

$R_{17}$, $R_{18}$ and $R_{19}$ are independently selected from hydrogen or halo; and $R_{20}$, $R_{21}$ and $R_{22}$ are independently selected from hydrogen, hydroxyl, halo, $NO_2$ and —$OCR_{17}R_{18}R_{19}$; or a tautomer or agriculturally acceptable salt thereof.

In some embodiments, the compound of formula (I) is a compound of formula (III):

(III)

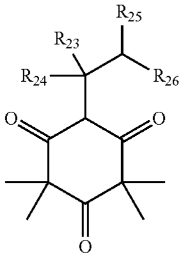

wherein one of $R_{23}$ and $R_{24}$ is hydrogen and the other is hydroxyl or $-OCR_{27}R_{28}R_{29}$ or $R_{23}$ and $R_{24}$ together form an oxo group (=O);

$R_{25}$ is $-CR_{30}R_{31}R_{32}$, $-CH_2CR_{30}R_{31}R_{32}$ or $-CH(CH_3)CR_{30}R_{31}R_{32}$;

$R_{26}$ is H or $-CH_3$; wherein where $R_{26}$ is H, $R_{25}$ is $-CH(CH_3)CR_{30}R_{31}R_{32}$;

$R_{27}$, $R_{28}$ and $R_{29}$ are independently selected from hydrogen or halo; and $R_{30}$, $R_{31}$ and $R_{32}$ are independently selected from hydrogen, hydroxyl, halo, $NO_2$ and $-OCR_{27}R_{28}R_{29}$; or a tautomer or agriculturally acceptable salt thereof.

In some embodiments, the compound of formula (I) is selected from:

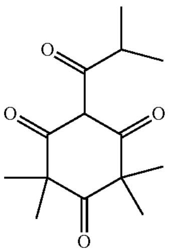 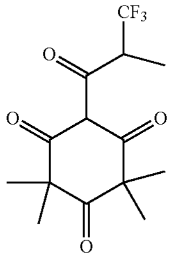 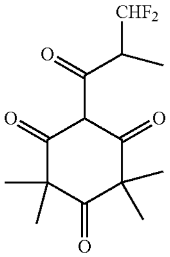

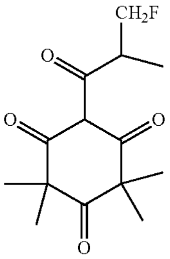 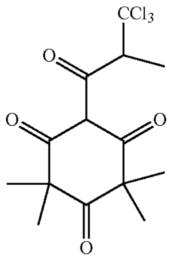 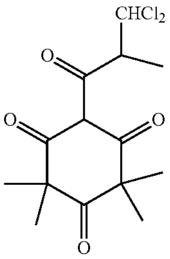

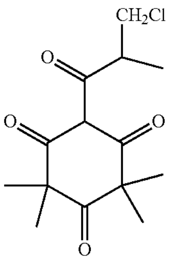 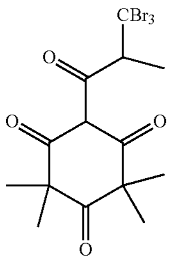 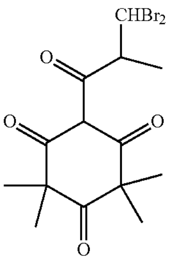

-continued

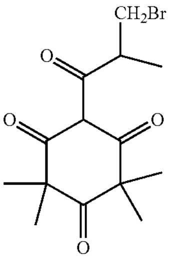 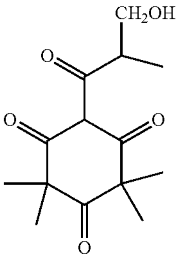 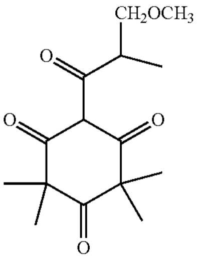

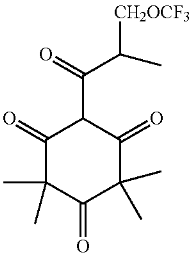 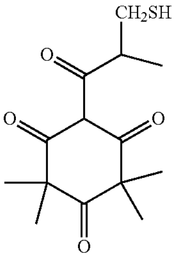 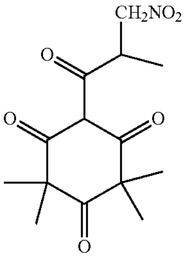

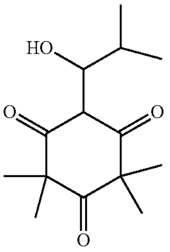 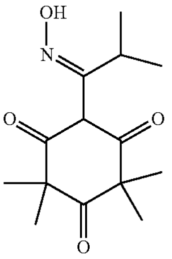 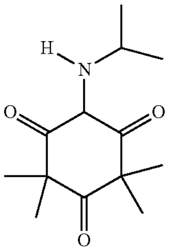

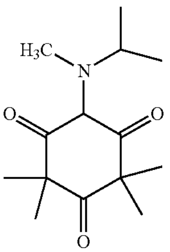 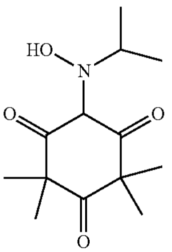 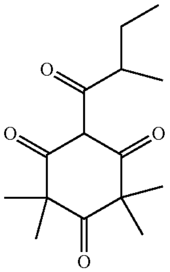

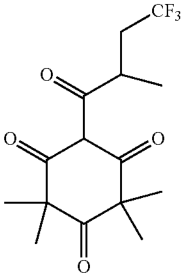 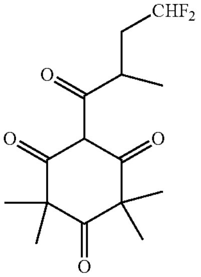

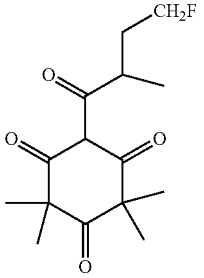 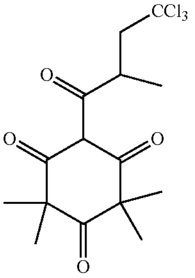

-continued
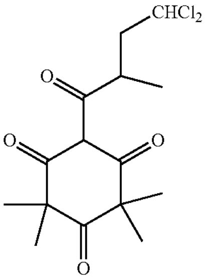
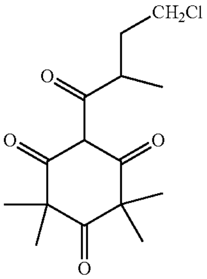
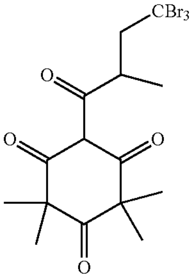
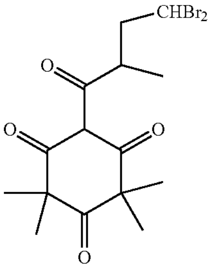
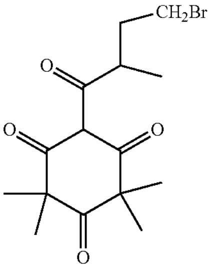
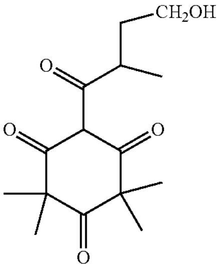
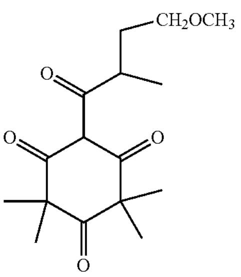
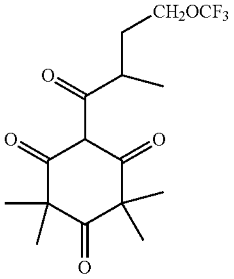
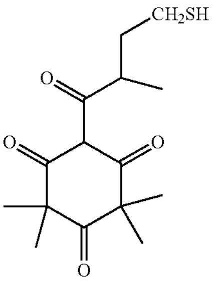
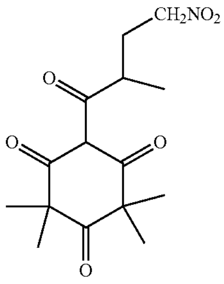
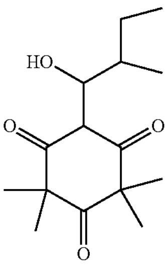
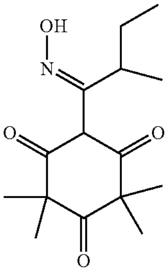
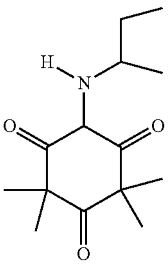
-continued
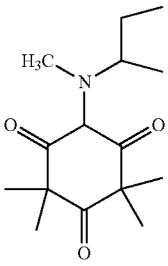
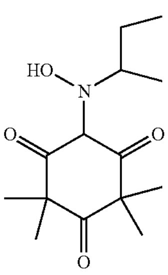
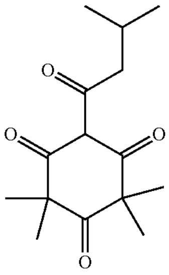
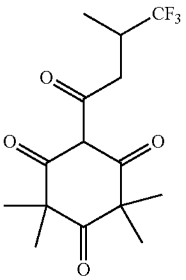
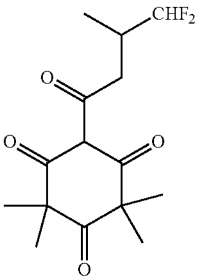
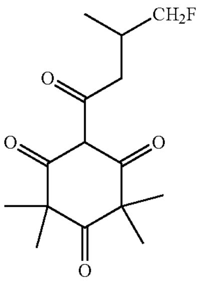
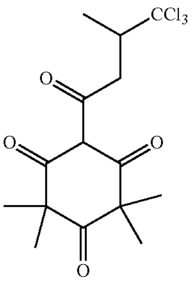
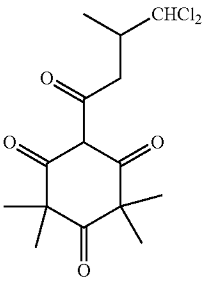
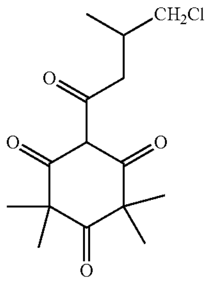
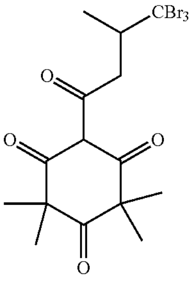
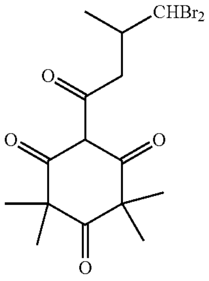
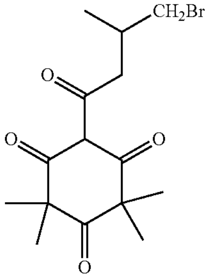
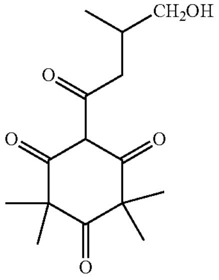

-continued

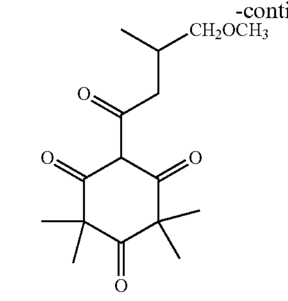

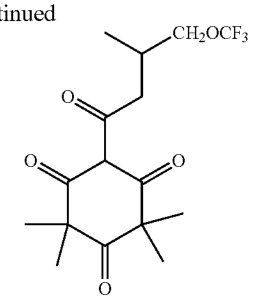

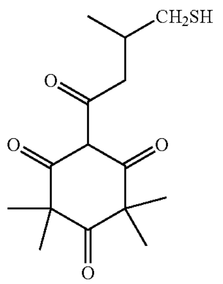

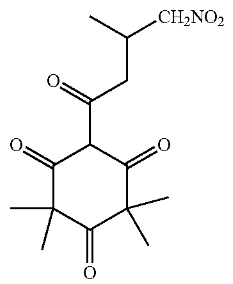

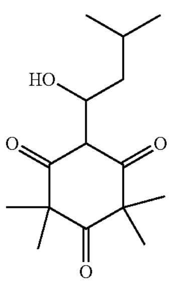

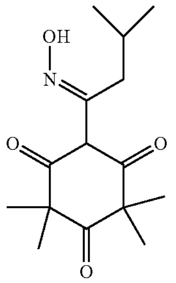

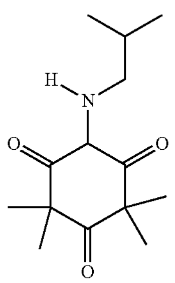

lp;1p

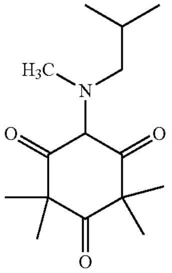

and

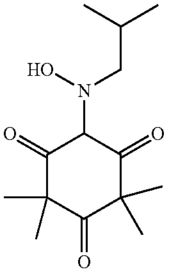

or a tautomer or agriculturally acceptable salt thereof.

In particular embodiments, the compound of formula (I) is flavesone, 1-isobutyroyl-3,3,5,5-tetramethylcyclohexan-2,4,6-trione:

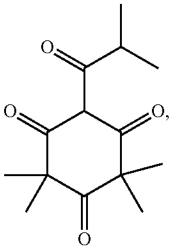

Leptospermone (1-valeroyl-3,3,5,5-tetramethylcyclohexane-2,4,6-trione):

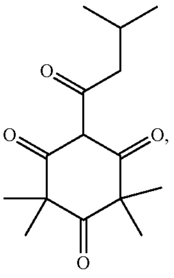

or isoleptospermone (1-isovaleroyl-3,3,5,5-tetramethylcyclohexane-2,4,6-trione):

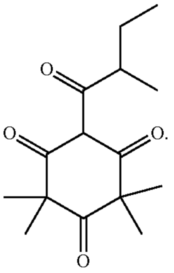

The compounds of formula (I) may be isolated from oil bearing trees such as trees from the Myrtaceae family such as *Leptospermum scoparium* and *Eucalyptus grandis.*

In other embodiments, the compound of formula (I) may be prepared synthetically for example as described in WO 2002/089587. For example, 1,3,5-trihydroxybenzene may be reacted with RCN in the presence of zinc chloride (Blatt, Org. Synth. Col 11, 1943, 522-523) as shown in scheme 1:

Scheme 1

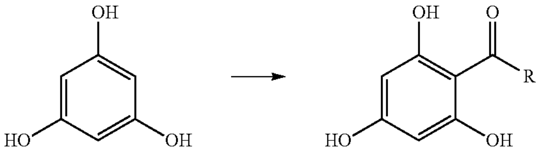

Anhydrous methyl iodide (6 Eq) is slowly added to the 1-acyl-2,4,6-trihydroxybenzene (1 eq) and sodium ethoxide (6 eq) in anhydrous methanol as shown in scheme 2 to afford the 1-acyl-3,3,5,5-tetramethyl-2,4,6-cyclohexatrione (U.S. Pat. No. 4,202,840).

Scheme 2

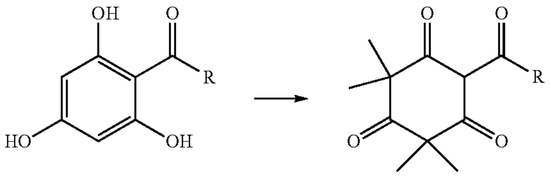

In some embodiments, the aphid pest is an aphid that infests a field crop plant, a horticultural crop plant, an orchard plant or an ornamental plant. Examples of aphid pests include green peach aphid (*Myzus persicae*), Russian wheat aphid (*Diuraphis noxia*), oat aphid or wheat aphid (*Rhopalosiphum padi*), soybean aphid (*Aphis glycine*), bluegreen aphid (*Aeyrthosiphon kondoi*), rose-grain aphid (*Metopolophium dirhodum*), rice root aphid (*Rhopalosiphum rufiabdominalis*), spotted alfalfa aphid (*Therioaphis trifolii*), cowpea aphid (*Aphis craccivora*), corn aphid (*Rhopalosiphum maidus*), cabbage aphid (*Brevicoryne brassicae*), turnip aphid (*Lipaphis erysimi*), pea aphid (*Aeyrthosiphon pisum*), potato aphid (*Macrosiphum euphorbiae*), rose aphid (*Macrosiphum rosae*), black bean aphid (*Aphis fabae*), cotton aphid (*Aphis gossypii*), apple aphid (*Aphis pomi*), foxglove aphid (*Aulacorthum solani*), thistle aphid (*Brachycaudus cardui*), apple-dock aphid (*Dysaphis radicola*), English grain aphid (*Macrosiphum avenae/Sitobion avenae*), vetch aphid (*Megoura viciae*), Black cherry aphid (*Myzus cerasi*), damson-hop aphid (*Phorodon humuli*) and wheat aphid (*Schizaphis graminum*).

In some embodiments, the aphid pest infests a field crop plant, especially green peach aphid (*Myzus persicae*), Russian wheat aphid (*Diuraphis noxia*), oat aphid or wheat aphid (*Rhopalosiphum padi*), cotton aphid (*Aphis gossypii*), soybean aphid (*Aphis glycine*), bluegreen aphid (*Aeyrthosiphon kondoi*), rose-grain aphid (*Metopolophium dirhodum*), rice root aphid (*Rhopalosiphum rufiabdominalis*), spotted alfalfa aphid (*Therioaphis trifolii*), cowpea aphid (*Aphis craccivora*), corn aphid (*Rhopalosiphum maidus*), cabbage aphid (*Brevicoryne brassicae*), turnip aphid (*Lipaphis erysimi*), pea aphid (*Aeyrthosiphon pisum*) and wheat aphid (*Schizaphis graminum*), especially green peach aphid (*Myzus persicae*) or Russian wheat aphid (*Diuraphis noxia*).

In some embodiments, the aphid pest is selected from the subfamily Aphidinae and the tribe Macrosiphini, especially the genus *Myzus*, the genus *Diuraphis* or the genus *Acyrthosiphon*, especially green peach aphid, Russian wheat aphid and bluegreen aphid, more especially green peach aphid and Russian wheat aphid.

In some embodiments, the aphid pest is an aphid that injects a toxin into the plant host. An example of this type of aphid is *Diuraphis noxia.*

In particular embodiments, the aphid pest is selected from green peach aphid (*Myzus pericae*) and Russian wheat aphid (*Diuraphis noxia*).

In some embodiments, the aphid is an aphid that is able to spread plant viruses, such as potyviruses, and therefore the method of the invention may reduce the incidence of viruses in a crop. Examples of potyviruses that may be prevented include mottle viruses and mosaic viruses.

Most conveniently, the aphid pest may be exposed to the compound of formula (I) by contact with the compound. For example, the aphid pest may be exposed to or contacted with the compound of formula (I) by spraying, such as aerial spraying, mobile boom spraying, localized spraying or by painting of plant host leaves with a composition containing the compound of formula (I). In other embodiments, the contact may be achieved by application of a solid form such as a powder or dust.

The aphid pest may be present in a field or pasture crop, a horticultural crop, an orchard plant or an ornamental plant. Exemplary field or pasture crops include wheat; barley; oats; canola; legumes such as those of the genera *Medicago, Trifolium, Melilotus* and *Lens*; sorghum; maize; rye grasses; cotton; pulses such as chickpea; faba bean, broad bean, field pea, lentil, lupin and mungbean; lucerne and triticale. Suitable horticultural crops include brassica crops such as broccoli, cabbage, Brussel sprouts, cauliflower, Chinese broccoli, Chinese cabbage, radishes and kale, tomato, eggplant, capsicum, beetroot, potato and sweet potato. Examples of orchard corps include apple trees and stonefruit trees such as peach trees, nectarine trees, apricot trees, plum trees and cherry trees. Exemplary ornamental plants include roses, chrysanthemums, carnations and orchids.

In particular embodiments, the aphid pest is present in a field or pasture crop, especially wheat, barley, oats, canola, sorghum, maize, rye grass, lucerne and triticale, more especially wheat, barley, oats, canola, maize and rye grass, most especially wheat, barley, oats and canola.

The pest-controlling effective amount may be readily determined by a person skilled in the art and may depend on the environment in which the compound is being applied and the means of application.

An effective amount of the compound of formula (I) may be in the range of about 0.1 to about 500,000 ppm, especially about 1 to about 200,000 ppm or about 10 to 100,000 ppm or in amounts of 0.01 to 500 g/L, especially 0.5 g/L to 50 g/L, more especially 3 g/L to 30 g/L. Suitable applications rates may be in the range of 50 to 500 g active ingredient (a.i.) per hectare in a spray volume of 100 L per hectare, or concentrations of a.i. in the range of 0.05 to 0.5%.

Formulations

While in some embodiments, the compound of formula (I) may be applied neat, in particular embodiments, the compound of formula (I) is applied in the form of a composition together with acceptable carriers, diluents and/or excipients. This also applies to exposure of the pests to the compound of formula (I).

The composition may be formulated into any suitable composition such as a spray, aerosol, oil, emulsifiable concentrate, wettable powder, flowable formulation, granulated formulation, powder, dust, solution, suspension, emulsion, capsule suspension or controlled release formulation. The composition may be formulated with solid or liquid carriers as appropriate. The choice of formulation and mode of application will depend on the pest being controlled, the environment it is being controlled in and the application method, and appropriate selection will be made with consideration of pest, plant host, application method and environment.

In some embodiments, the formulation may contain naturally occurring additive, such as antioxidants and stabilizers. For example, antioxidants may include α-tocopherol, and suitable stabilizers may include gum arabic, guar gum, locust bean gum, xanthan gum, kelgum, polyvinyl alcohol, sodium caseinate and mixtures thereof.

Examples of solid carriers useful in preparing the formulations are clays including kaolin clay, diatomite, water-containing synthetic silicon oxide, bentonite, Fubasami clay, and acid clay; talcs; ceramics; inorganic minerals such as Celite™, quartz, sulfur, active carbon, calcium carbonate and hydrated silica; these solid carriers being finely divided or granular. Examples of useful liquid carriers are water, alcohols such as methanol and ethanol, ketones such as acetone and methyl ethyl ketone, aromatic hydrocarbons such as benzene, toluene, xylene, ethylbenzene and methylnaphthalene, aliphatic hydrocarbons such as hexane, cyclohexane, kerosene and light oil, esters such as ethyl acetate and butyl acetate, nitriles such as acetonitrile and isobutyronitrile, ethers such as diisopropyl ether and dioxane, acid amides such as N,N-dimethylformamide and N,N-dimethylacetamide, halogenated hydrocarbons such as dichloromethane, trichloroethane and carbon tetrachloride, dimethyl sulfoxide, and fish oils, mineral oils, plant derived oils such as olive oil, canola oil, cotton-seed oil, soybean oil and sesame oil as well as essential oils such as lavender oil, eucalyptus oil, tea tree oil, citrus oil etc. Solid or liquid carriers can be used alone or in combination. Examples of gas carriers, those of propellants, are butane gas, isobutene, pentane, LPG (liquefied petroleum gas), dimethyl ether, fluorocarbons and carbon dioxide gas.

Examples of surfactants are alkylsulfuric acid esters, alkylsulfonic acid salts, alkylarylsulfonic acid salts, alkyl aryl ethers and polyoxyethylene adducts thereof, polyethylene glycol ethers, polyhydric alcohol esters, sugar alcohol derivatives, sorbitane monolaurate, alkylallyl sorbitane monolaurate, alkylbenzene sulfonate, alkylnaphthalene sulfonate, lignin sulfonate, and sulfuric acid ester salts of higher alcohols. These surfactants may be used alone or in combination.

Examples of adjuvants for the formulations, such as binders and dispersants, are casein, gelatin, polysaccharides such as starch, gum arabic, cellulose derivatives and alginic acid, lignin derivatives, bentonite, sugars and water-soluble synthetic high molecular-weight substances such as polyvinyl alcohol, polyvinyl pyrrolidone and polyacrylic acids. Examples of stabilisers are PAP (acid isopropyl phosphate), BHT (2,6-di-tert-butyl-4-methylphenol), BHA (mixture of 2-tert-butyl-4-methoxyphenol and 3-tert-butyl-4-methoxyphenol), synergists such as piperonyl butoxide, vegetable oils, mineral oils, fish oils, surfactants and fatty acids or esters thereof.

Emulsifying agents that may be used are suitably one or more of those selected from non-ionic or anionic emulsifying agents. Examples of non-ionic emulsifying agents include, but are not restricted to, polyoxyethylenealkylphenylether, polyoxyethylenealkylether, polyethyleneglycol fatty ester, sorbitan fatty ester, polyoxyethylene sorbitan fatty ester, polyoxyethylenesorbitol fatty ester, polyoxyethylenepolyoxypropylenealkylether. Examples of anionic emulsifying agents include alkyl sulphates, polyoxyethylenealkylether sulphates, sulfosuccinates, taurine derivatives, sarcosine derivatives, phosphoric esters, alkylbenzenesulfonates and the like. A particular mixture comprises or consists of polyoxyethylenestyrylphenylether and calcium allylbenzenesulfonate. These emulsifying agents may be used in an amount of 1 to 20 weight parts per 100 weight parts of the compositions of the present invention.

In some embodiments, the compound of formula (I) is formulated as a spray. The spray may be formulated as a liquid for use in a atomizer or aerosol. In some embodiments, the liquid solubilizes the compound of formula (I), for example, where the liquid or solvent is an oil or hydrocarbon solvent. In other embodiments, the liquid is an aqueous liquid and the formulation is in suspension or emulsion form.

In some embodiments, the composition may include a propellant such as butane, isobutene, pentane, carbon dioxide or nitrogen.

In order that the invention may be readily understood and put into practical effect, particular embodiments will now be described by way of the following non-limiting examples.

EXAMPLES

Example 1: Control of Russian Wheat Aphid with Flavesone

The efficacy of flavesone against Russian Wheat Aphid (*Diuraphis noxia*) was assessed using the leaf dip method described in Moores et al 1994 (Pesticide Biochemistry and Physiology, 49, 114-120), adapted for use with cereal aphids by using wheat leaf segments.

Serially diluted concentrations of flavesone (1 to 30000 mg/L) were tested at rates designed to include the expected field rate in cereals (Table 1), along with a control of water. Leaf segments (25 mm) cut from wheat (*Triticum aestivum*) plants were submerged for 1 second in the insecticide solutions or water (control), and placed adaxial side up on 10 g/L agar in 35 mm petri dishes. Once leaves were air-dry, eight 3-4 day old *D. noxia* nymphs were transferred to insecticide-dipped leaf segments using a fine-haired paintbrush. The population used was originally collected from Dingee (VIC) and maintained in the laboratory under a 18:6 LD cycle at 12-20° C. since June 2016.

TABLE 1

| Insecticide | Active ingredient | Field rate | Concentration | Batch no. |
|---|---|---|---|---|
| Flavocide 500EW | Flavesone 500 g/L | 2000 mL/100 L* | 10,000 mg a.i./L | ACF-467 |

The petri dishes were then inverted onto a lid containing a 25 mm diameter filter paper to control humidity, and were placed at 18° C.±2° C. with a photoperiod of 16:8 LD cycle. Six replicates were used for each concentration tested, and responses were assessed after 48 and 96 hours. Aphids were scored as alive (vibrant and moving freely), dead (not moving over a 5 second period), or incapacitated (inhibited movement). Incapacitated individuals were pooled with dead individuals for analysis as they invariably die and therefore do not contribute to the next generation.

Dose-response curves were generated by plotting percentage mortality against log concentration. Mortality data was analysed using a logistic regression model with random effects. Logistic regression is suited for the analysis of binary response data (i.e. dead/alive) with the random effect component of the model controlling for the non-independence of mortality scores within replicates. Concentrations that resulted in 50, 90, and 99% mortality (lethal concentration, LC) (along with 95% confidence intervals, CIs) were calculated using a binomial logistic regression (Robertson & Preisler 1992, Pesticide Bioassays with Arthropods, CRC: Boca Ratan; Venables & Ripley 2002, Modern Applied Statistics with S., Springer, NY, on the World Wide Web at: stats.ox.ac.uk/pub/MASS4). Analyses were conducted using R version 3.3.1 (R Development Core Team 2018, R: A language and environment for statistical computing. R Foundation for Statistical Computing, Vienna, Austria. On the World-Wide Web at: R-project.org).

Results

Control mortality was low for the duration of the bioassay. Mortality responses of *D. noxia* to concentrations of flavesone indicate that this compound is toxic to *D. noxia* (FIG. 1). The range of concentrations tested (1-30,000 mg a.i./L) elicited all mortality responses from low mortality to 100% mortality. Mortality began to increase once concentrations reached 300 mg a.i./L, resulting in 100% mortality at 30,000 mg a.i./L at 48 hours exposure. Mortality increased between 48 and 96 hours, suggesting that flavesone was still acting after 48 hours; the largest increase of 58% mortality occurred at 3,000 mg a.i./L. The $LC_{50}$ value (and 95% CIs) was estimated as 405 (261-630) mg a.i./L (Table 2).

TABLE 2

| Active ingredient | Regression slope coefficients (±SE) | LC quantile | LC (mg a.i./L) | Lower-upper 95% Cis (mg a.i./L) |
|---|---|---|---|---|
| Flavesone | 0.60 (0.06) | $LC_{50}$ | 405.4 | 261.1-629.5 |
| | | $LC_{90}$ | $1.5 \times 10^4$ | $6.6 \times 10^3$-$3.6 \times 10^4$ |
| | | $LC_{99}$ | $8.1 \times 10^5$ | $1.8 \times 10^5$-$3.6 \times 10^6$ |

This study demonstrates that flavesone is efficacious against *D. noxia*. The $LC_{50}$ of flavesone was calculated to be between 261-630 mg a.i./L.

Example 2: Control of Green Peach Aphid with Flavesone

The efficacy of flavesone against green peach aphid (*Myzus persicae*) was tested in a similar leaf dip assay as set out in Example 1, but used Chinese cabbage leaves, and 10 to 100,000 mg/L flavesone concentrations. The green peach aphids used were cultured in the laboratory from field collected insects.

Results

Figure 2:
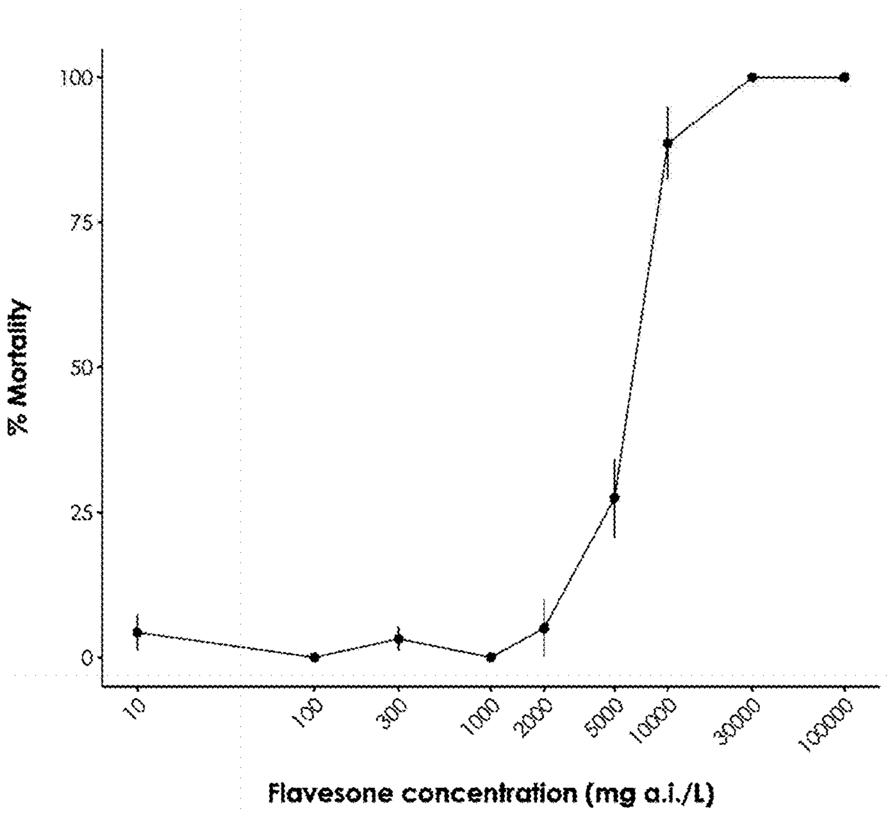
FIG. 2 is a graphical representation of a dose response curve of *M. persicae* when exposed to flavesone after 48 hours.
Figure 3:
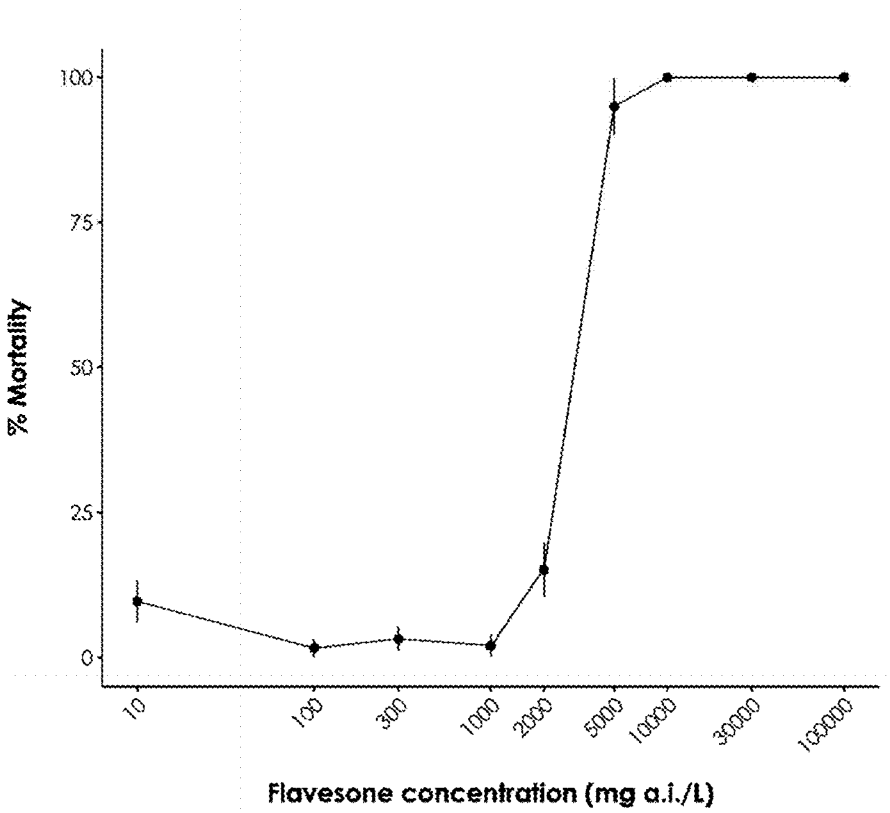
FIG. 3 is a graphical representation of a dose response curve of *M. persicae* when exposed to flavesone after 96 hours.

Control mortality was low for the duration of the bioassay. Mortality responses of green peach aphid to concentrations of flavesone indicate that this compound is toxic to green peach aphid (FIGS. 2 and 3). The range of concentrations tested (10 to 100,000 mg/L flavesone) elicited mortality responses from no response to 100% mortality. Mortality responses began to increase when the concentration reached 1000 mg/L resulting at 100% mortality at 30,000 mg/L at 48 hours exposure (FIG. 2). Mortality increased between 48 hours and 96 hours suggesting flavesone was still active after 48 hours. At 96 hours, mortality increased at 1000 mg/L of flavesone resulting in 100% mortality at 10,000 mg/L (FIG. 3).

Example 3: Field Trial—Control of Cotton Aphid (*Aphisgossypii*) in Cotton

A field trial was conducted on a small plot of cotton in March 2018 to evaluate flavesone for the control of cotton aphid in cotton. The trial was conducted near Burren Junction in the Lower Namoi Valley Region of New South Wales, Australia. The trial was conducted in a crop grown as per standard commercial practice. It was precision planted on hills in rows 1 m apart and furrow flood irrigated. The crop was fully irrigated being watered as required over the duration of the season. The crop matured to produce good yield, typical of the region for the season. Light rainfall occurred at 6 and 7 days after treatment (DAT). The maximum temperature ranged from 28 to 38° C. and minimum temperature ranged from 14 to 23° C.

The plot was 4 m×8 m and four replicates were used. The plot was infested with cotton aphid at a moderate to high level with 36% of leaves infested pre-spray. The population on the untreated cotton increased over the duration of the trial with 83% leaves infested at 7 DAT.

The crop was either left untreated (control), treated with flavesone (Flavocide 500 EW) at varying concentrations or treated with Pirimor® (pirimicarb, positive control) as set out in Table 3:

TABLE 3

| No. | Formulation | Rate |
|---|---|---|
| 1 | Untreated | — |
| 2 | Flavesone | 0.1% v/v |
| 3 | Flavesone | 0.25% v/v |
| 4 | Flavesone | 0.50% v/v |
| 5 | Flavesone | 0.75% v/v |
| 6 | Flavesone | 1.00% v/v |
| 7 | Pirimor ® | 300 g/ha |

The test solution was applied by broadcast method using a hand held boom sprayer with nozzles (Spraying Systems TT110015 flat fans) spaced 50 cm apart, with pressure being 250 kPa. Application speed was 1.5 m/s and the application volume was 105 L/ha.

The effectiveness of the application was evaluated on day 0 and 3 and 7 DAT. 20 leaves in the upper canopy of the plants in each plot were inspected and the number of aphids on each leaf recorded. The percentage of leaves infested and the mean number of aphids per leaf was then determined.

The crop in each plot was inspected for the presence of phytotoxicity. No phytotoxicity was observed.

Statistical analyses were conducted using GenStat 64-bit Release 17.1 (PC/Windows Server 2008, VSN International Ltd). The model includes all treatment effects. Analysis of variance and least significant difference (LSD) procedures were used. Further means of separation was achieved by transforming the data using Square Root (x+0.5) or Log Base 10.

The results are set out in Tables 4 and 5:

TABLE 4

Mean Percentage of Leaves infested with cotton Aphid

| Treatment | Rate of treatment | 0 DAT | 3 DAT | 7 DAT |
|---|---|---|---|---|
| Untreated | — | 48 | 50 | 83 d |
| Flavesone | 0.1% v/v | 34 | 15 | 43 c |
| Flavesone | 0.25% v/v | 43 | 39 | 38 bc |
| Flavesone | 0.50% v/v | 30 | 19 | 40 c |
| Flavesone | 0.75% v/v | 33 | 34 | 50 c |
| Flavesone | 1.00% v/v | 26 | 9 | 19 b |
| Pirimor ® | 300 g/ha | 35 | 6 | 4 a |
| F Probability | | 0.182 | 0.128 | <0.001 |
| LSD 5 | | ns | ns | # |

Means within the same column with a letter in common are not significantly different (P > 0.05; ns = not significant,
# = Means separation based on analysis of transformed data using square root (x + 0.5)

TABLE 5

Mean Number of Cotton Aphid per leaf

| Treatment | Rate of treatment | 0 DAT | 3 DAT | 7 DAT |
|---|---|---|---|---|
| Untreated | — | 5.5 c | 3.4 b | 9.8 d |
| Flavesone | 0.1% v/v | 1.5 ab | 1.1 ab | 2.5 bc |
| Flavesone | 0.25% v/v | 2.6 b | 2.1 ab | 3.1 c |
| Flavesone | 0.50% v/v | 1.1 . . . ab | 1.0 ab | 2.4 bc |
| Flavesone | 0.75% v/v | 1.4 ab | 3.4 b | 2.7 bc |
| Flavesone | 1.00% v/v | 0.6 a | 0.2 a | 1.0 ab |
| Pirimor ® | 300 g/ha | 2.1 b | 0.1 a | 0.0 a |
| F Probability | | 0.001 | 0.043 | <0.001 |
| LSD 5 | | # | # | # |

Means within the same column with a letter in common are not significantly different (P > 0.05;
# = Means separation based on analysis of transformed data using square root (x + 0.5)

The targeted aphid population was variable which resulted in differences in the number of aphids per leaf in the pre-spray controls. No differences were observed in the leaf infestation levels at this time.

Flavesone applied up to an application rate of 0.75% v/v provided similar significant control of cotton aphid, with the highest 1% v/v rate giving slightly better control. The positive non-natural control Pirimor® performed better than flavesone treatment.

What is claimed is:

1. A method of controlling aphid pests comprising exposing the aphid pests on a host plant to a pest-controlling effective amount of a compound of formula (I):

(I)

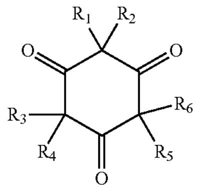

wherein:

$R_1$ is selected from —C(═O)$R_7$, —$OR_8$, —$SR_8$, —$C_{1-10}$hydroxyalkyl, —$NR_9R_{10}$, —C(═N—$R_9$)$R_7$, —C(═N—OH)$R_7$, —NO, —$NO_2$, —N($OR_8$)$R_7$ and —$OSO_3R_8$;

$R_2$ is selected from hydrogen, —$C_{1-10}$alkyl, —$C_{2-10}$alkenyl, aryl and heteroaryl;

$R_3$, $R_4$, $R_5$ and $R_6$ are each independently selected from the group consisting of hydrogen, —$C_{1-10}$alkyl, —$C_{3-6}$cycloalkyl, —$C_{2-10}$alkenyl, —$C_{1-10}$haloalkyl, —$C_{1-10}$dihaloalkyl, —$C_{1-10}$trihaloalkyl, —$OR_8$, —$SR_8$, —$NR_9R_{10}$, —C(═N—$R_9$)$R_7$, —NO, —$NO_2$, —$NR_9OR_8$, —$OSO_3R_8$, —$C_{1-10}$alkylaryl and —C(═O)$R_7$;

$R_7$ is selected from the group consisting of hydrogen, —$C_{1-10}$alkyl, —$C_{2-10}$alkylaryl, $C_{3-6}$cycloalkyl, —$C_{2-10}$alkenyl, —$C_{1-10}$ alkylheteroaryl, —$C_{1-10}$ haloalkyl, —$C_1$-10dihaloalkyl, —$C_{1-10}$trihaloalkyl, —$C_{1-10}$haloalkoxy, —$C_{1-10}$hydroxyalkyl, —$C_{1-10}$thioalkyl, —$C_{1-10}$nitroalkyl, —$C_{1-3}$alkyl$OC_{1-3}$alkyl, —$C_{1-3}$alkyl$OC_{1-3}$ haloalkyl, —$C_{1-3}$ alkyl$OC_{1-3}$ dihaloalkyl, —$C_{1-3}$alkyl$OC_{1-3}$trihaloalkyl, —$OR_8$, —$SR_8$ and —$NR_9R_{10}$;

$R_8$ is selected from the group consisting of hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl and —$C_{1-10}$nitroalkyl;

$R_9$ and $R_{10}$ are independently selected from the group consisting of hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$ dihaloalkyl, —$C_{1-10}$trihaloalkyl; or a tautomer or agriculturally acceptable salt thereof, and wherein the pest-controlling effective amount is an amount applied to the host plant at a rate of from about 300 g/ha to about 3000 g/ha.

2. The method according to claim 1 wherein the compounds of formula (I) is a compound of formula (II):

(II)

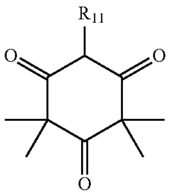

wherein:

$R_{11}$ is selected from the group consisting of —$CR_{12}R_{13}R_{14}$ or —$NR_{15}R_{16}$;

one of $R_{12}$ and $R_{13}$ is hydrogen and the other is hydroxyl or —$OCR_{17}R_{18}R_{19}$ or $R_{12}$ and $R_{13}$ together form an oxo group (═O) or a ═N—OH group;

$R_{14}$ is —CH($CH_3$)$CR_{20}R_{21}R_{22}$, —$CH_2$CH ($CH_3$) $CR_{20}R_{21}R_{22}$ or —CH($CH_3$)$CH_2CR_{20}R_{21}R_{22}$;

$R_{15}$ and $R_{16}$ are independently selected from the group consisting of hydrogen and $C_{1-10}$alkyl;

$R_{17}$, $R_{18}$ and $R_{19}$ are independently selected from the group consisting of hydrogen or halo; and $R_{20}$, $R_{21}$ and $R_{22}$ are independently selected from the group consisting of hydrogen, hydroxyl, halo, $NO_2$ and —$OCR_{17}R_{18}R_{19}$; or a tautomer or agriculturally acceptable salt thereof.

3. The method according to claim 1 wherein the compound of formula (I) is a compound of formula (III):

(III)

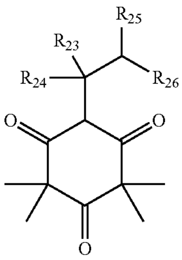

wherein:

one of $R_{23}$ and $R_{24}$ is hydrogen and the other is hydroxyl or —$OCR_{27}R_{28}R_{29}$ or $R_{23}$ and $R_{24}$ together form an oxo group (═O);

$R_{25}$ is —$CR_{30}R_{31}R_{32}$, —$CH_2CR_{30}R_{31}R_{32}$ or —CH($CH_3$) $CR_{30}R_{31}R_{32}$;

$R_{26}$ is H or —$CH_3$; wherein where $R_{26}$ is H, $R_{25}$ is —CH($CH_3$)$CR_{30}R_{31}R_{32}$;

$R_{27}$, $R_{28}$ and $R_{29}$ are independently selected from the group consisting of hydrogen or halo; and $R_{30}$, $R_{31}$ and $R_{32}$ are independently selected from the group consisting of hydrogen, hydroxyl, halo, $NO_2$ and —$OCR_{27}R_{28}R_{29}$; or a tautomer or agriculturally acceptable salt thereof.

4. The method according to claim 1 wherein the compound of formula (I) is selected from the group consisting of:

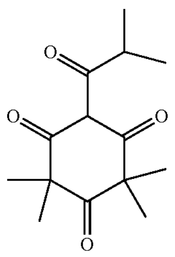
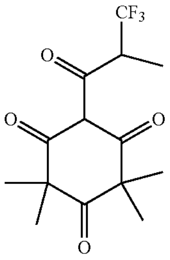
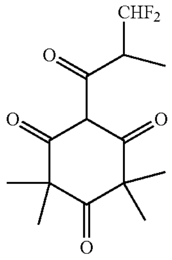
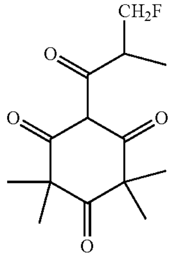
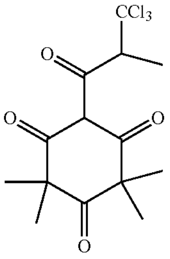
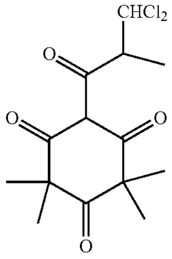
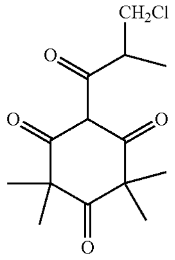
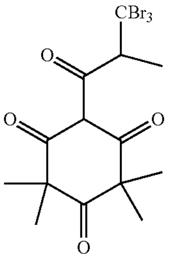
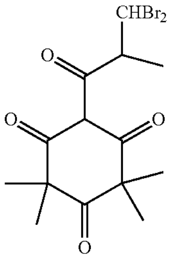
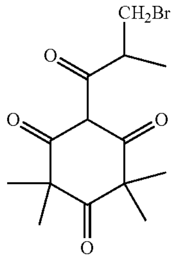
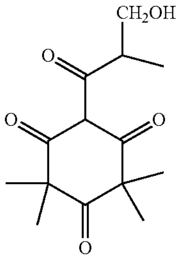
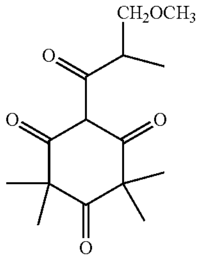
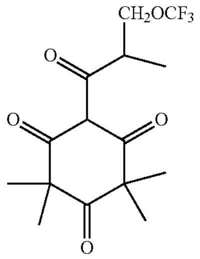
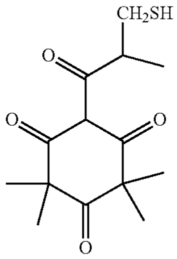
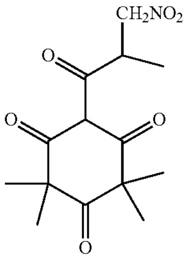
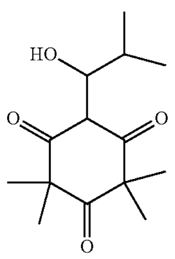
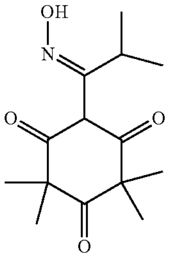
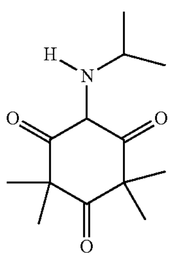
-continued
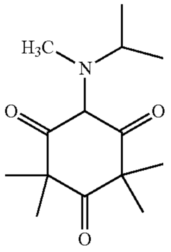
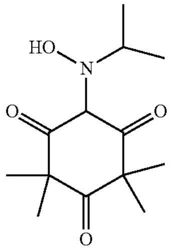
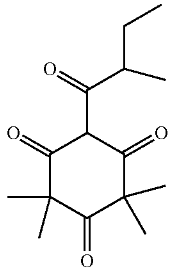
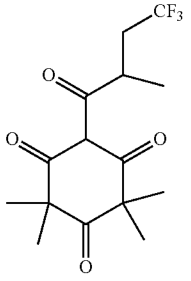
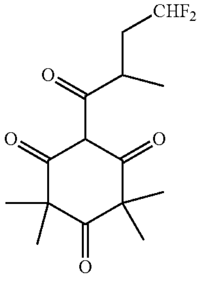
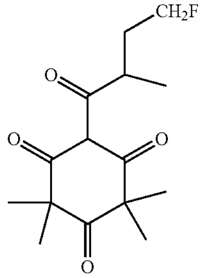
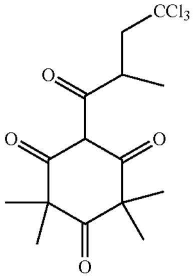
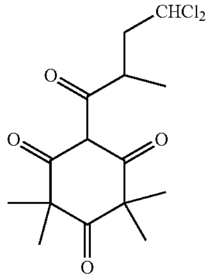
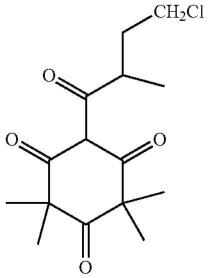
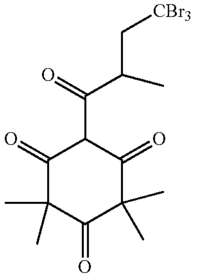
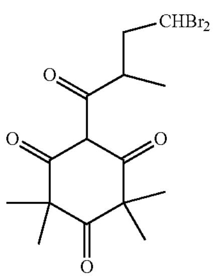
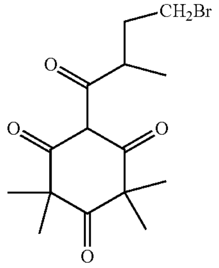
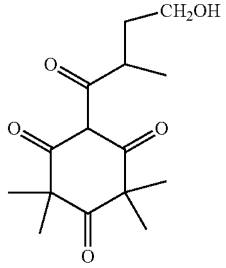

-continued
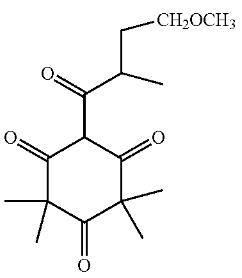
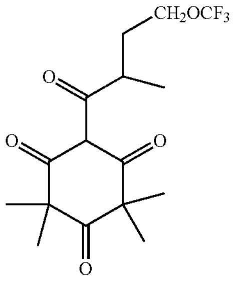
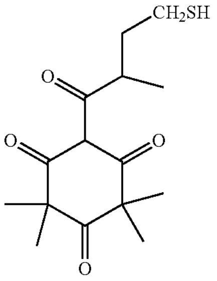
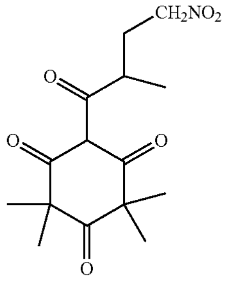
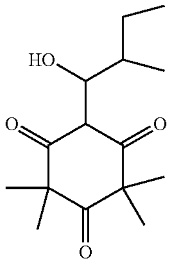
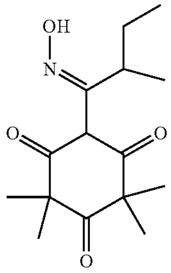
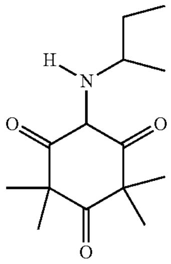
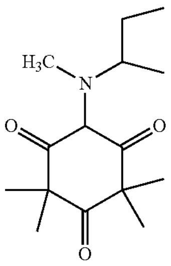
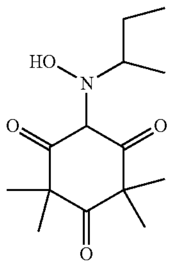
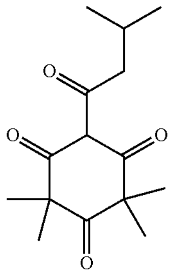
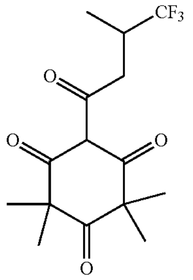
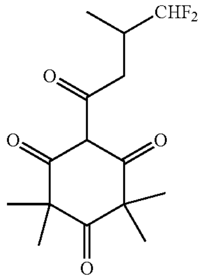
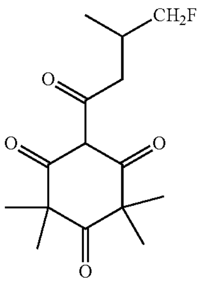
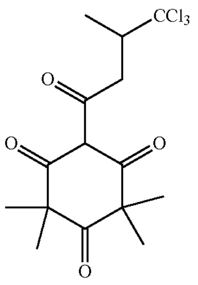
-continued
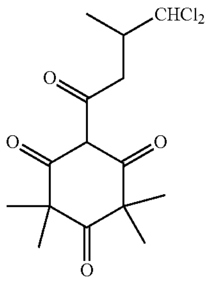
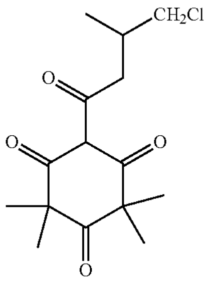
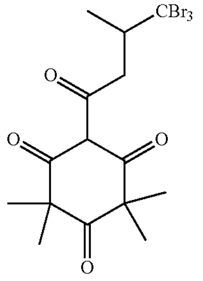
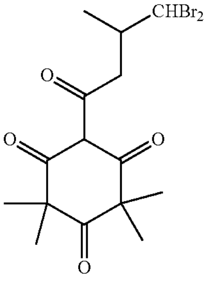
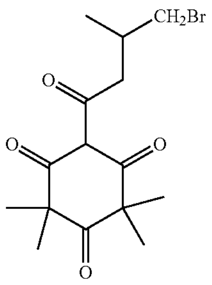
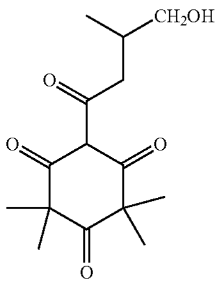
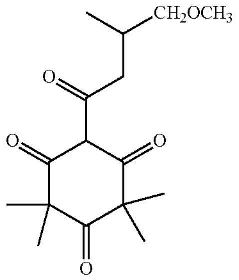
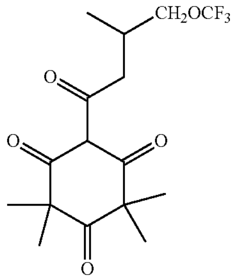
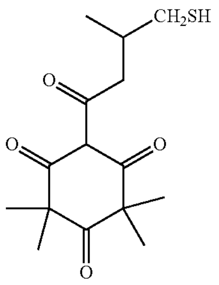
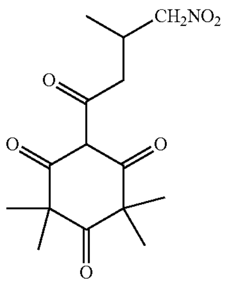
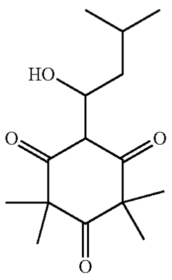
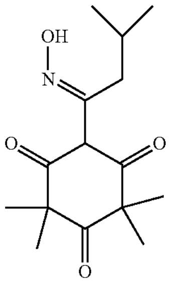
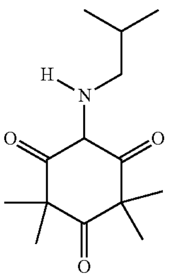

-continued

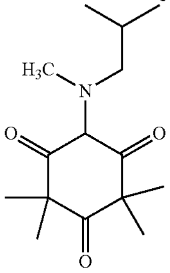

and

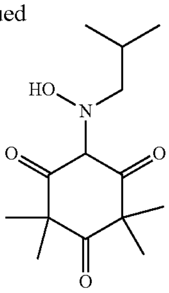

and a tautomer or agriculturally acceptable salt thereof.

5. The method according to claim 1, wherein the compound for formula (I) is selected from the group consisting of flavesone, leptospermone and isoleptospermone.

6. The method according to claim 5, wherein the compound of formula (I) is flavesone.

7. The method according to claim 1, wherein the aphid pest is from the subfamily Aphidinae and the tribe Macrosiphini.

8. The method according to claim 1, wherein the aphid pests are selected from the group consisting of the genus *Myzus*, the genus *Diuraphis* and the genus *Acyrthosiphon*.

9. The method according to claim 1, wherein the pest controlling effective amount is applied using a concentration of from about 3 g/L to about 30 g/L of the compound of formula (I).

* * * * *